United States Patent [19]

Pieters

[11] 4,047,802
[45] Sept. 13, 1977

[54] REFLECTING DEVICE

[75] Inventor: Eli Pieters, Brooklyn, N.Y.

[73] Assignee: Lawrence Peska Associates, Inc., New York, N.Y. ; a part interest

[21] Appl. No.: 703,355

[22] Filed: July 8, 1976

[51] Int. Cl.² .............................................. G02B 5/12
[52] U.S. Cl. ................................. 350/97; 301/37 R; 350/DIG. 3
[58] Field of Search ................ 350/DIG. 3, 109, 294, 350/97, 105–107, 294; 40/130 R, 136; 301/37 R, 37 SA; 296/97 D, 95 C, 97 C

[56] References Cited

U.S. PATENT DOCUMENTS

| 2,855,242 | 10/1958 | Holmes | 296/97 D |
| 3,042,111 | 9/1959 | Wytovich | 296/95 C |
| 3,670,438 | 6/1972 | Carroll et al. | 350/DIG. 3 |
| 3,687,794 | 8/1972 | Shanok et al. | 350/97 |

Primary Examiner—John K. Corbin
Assistant Examiner—B. W. delos Reyes
Attorney, Agent, or Firm—Wenderoth, Lind & Ponack

[57] ABSTRACT

A reflecting device for use with a vehicle having a front and/or rear windshield having a peripheral frame of magnetizable material. The device includes a support member which is configured to define a border around the windshield. The support member is mounted on one face to the frame by a plurality of magnets embedded in the member. Light reflecting material is disposed on the other face of the support member.

3 Claims, 5 Drawing Figures

REFLECTING DEVICE

BACKGROUND OF THE INVENTION

The present invention relates to a reflecting device for use with a vehicle windshield.

Reflecting devices are known in the art as shown in U.S. Pat. 2,122,156 and particularly for use on road signs which are illuminated by vehicle headlights. When used in this application, the reflecting devices are positioned to form letters or members and are not used to border a particular area. An example of this is shown in U.S. Pat. Nos. 2,234,478, 2,251,386, 2,652,651 and 3,399,477. In another application, the reflecting device is merely used as a signal to an approaching vehicle as shown in U.S. Pat. No. 2,389,234.

Additionally, in these applications the reflecting devices are connected to signs and thus do not disclose means for connecting the device to a vehicle windshield.

SUMMARY OF THE INVENTION

It is the principle object of this invention to provide a reflecting device for a vehicle that can be applied to a windshield frame for outlining the frame by reflecting incident light and thereby warn others of the presence of the vehicle.

It is a further object of this invention to provide a device that can be easily be installed over the windshield frame.

These and other objects are achieved by the preferred embodiment of the present invention which comprises a support member configured to be placed in superposed position over a front and/or rear windshield frame. A plurality of reflectors is embedded in one side of the support member and a plurality of magnets is embedded in the other side. The magnets serve to hold the device to the frame which is comprised of magnetizable material.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

BRIEF DESCRIPTION OF THE DRAWING

The invention will be described in detail, by way of example, with reference to the accompanying drawing in which.

DETAILED DESCRIPTION OF THE INVENTION

Figure 1:
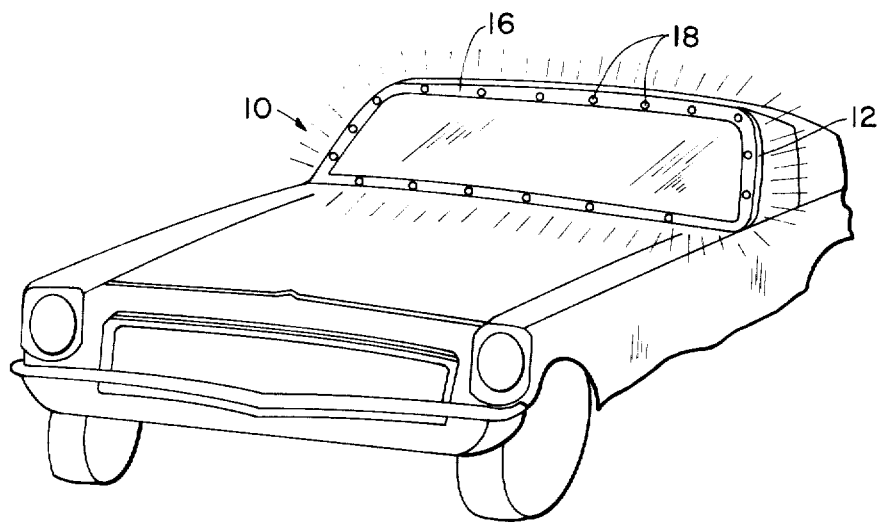
FIG. 1 is a pictorial representation of the preferred embodiment connected to a front windshield frame of a vehicle.
Figure 2:
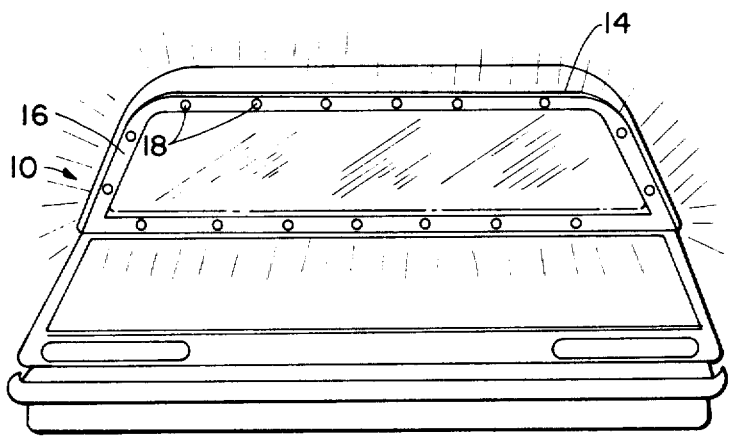
FIG. 2 is a rear view in elevation of the preferred embodiment connected to a rear windshield frame of the vehicle.
Figure 3:
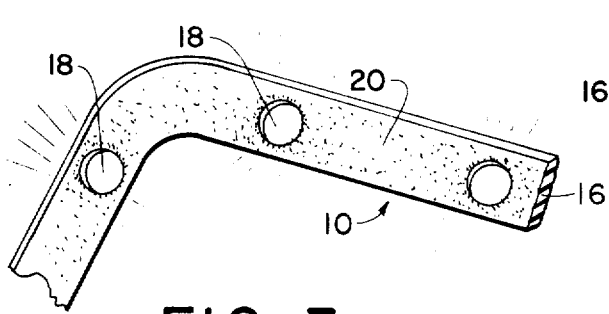
FIG. 3 is an enlarged partial pictorial representation of the preferred embodiment showing the reflectors.
Figure 4:
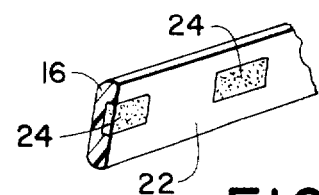
FIG. 4 is an enlarged pictorial representation of a portion of the preferred embodiment showing the embedded magnets.

Referring to FIGS. 1 and 2 of the drawing and in accordance with the principles of the invention, a reflecting device 10 is shown affixed to the front and rear peripheral windshield frames 12 and 14 respectively. Referring now to FIG. 3, a portion of the drawing, a reflecting device 10 is shown comprising a support member 16, made of a rubber like or plastic material and configured to define a border around the windshield frame, 12 and 14, and further having at least a portion coincident therewith. Circular light reflectors 18 composed of a light reflecting material are spaced along and outside face 20 of the support member 16. The inside or connecting face 22 of the support member 16 as shown in FIG. 4 comprises a plurality of magnets 24 embedded therein. The windshield frames 12 and 14 are made of magnetizable material such as steel and connect to the device 10 by magnetic attraction.

Figure 5:
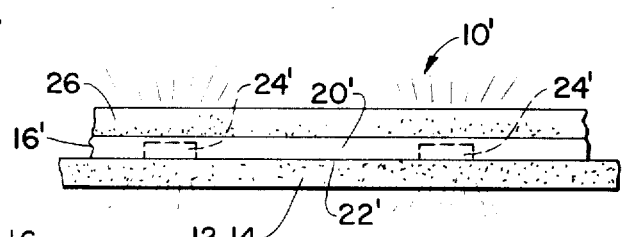
FIG. 5 is a partial edge view in elevation of an alternative embodiment.

An alternative embodiment 10' is shown in FIG. 5 in which the reflecting material is formed as a continuous member 26 disposed on the outside face 20' of the support member 16'. Magnets 24' embedded in the inside surface 22' function as in the previously described embodiment.

While preferred and other exemplary embodiments of the invention are illustrated and/or described, it will be understood that the invention is in no way limited to these embodiments.

What is claimed is:

1. A reflecting device for use with a vehicle with a windshield having a peripheral frame composed of a magnetizable material, said device comprising:
   a rubber-like support member configured to define and attached to a border surrounding the windshield completely;
   said support member being substantially planar on both surfaces thereof;
   b. a retroreflective means disposed on one surface of the said support member; and
   c. a plurality of magnets of the said support member and imbedded in the surface of the support member opposite to the surface on which said light retroreflective means is disposed.
   said plurality of magnets being imbedded in recesses spaced apart along the surface of said support member;
   said magnets being so disposed so as to be flush with the surface of said support member opposite the retroreflective means.

2. A reflecting device according to claim 1 wherein said retroreflective means is continuously disposed on the outside face of said support member.

3. A reflecting device according to claim 1 wherein said retroreflective means are circular and are spaced along the outside surface of said support member.

* * * * *